Jan. 30, 1934.  N. VACHER  1,945,005

LOCK FOR NUTS AND BOLTS

Filed March 29, 1930

INVENTOR
Nicolas Vacher.
BY: A. E. Odell
ATTORNEY.

Patented Jan. 30, 1934

1,945,005

UNITED STATES PATENT OFFICE 1,945,005

LOCK FOR NUTS AND BOLTS

Nicolas Vacher, Moingt, France

Application March 29, 1930, Serial No. 440,101, and in France December 9, 1929

1 Claim. (Cl. 151—38)

This invention relates to locking devices for screwed members such as nuts and bolts and consists broadly stated in a washer of spring material having normally a truncated conical form, the said washer being retained in rotatable connection with the working face of the nut or the bolt head by a beading, the arrangement being such that the washer cannot be strained beyond its elastic limit.

Figure 1:
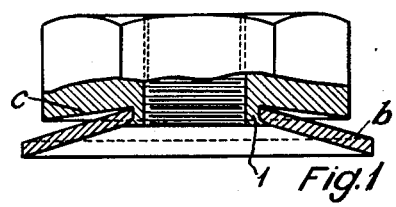
Figure 4:
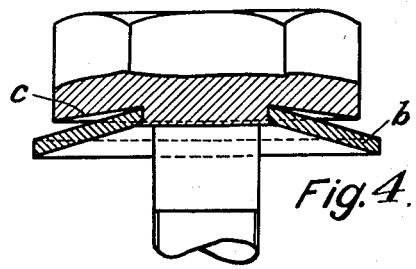
Figure 2:
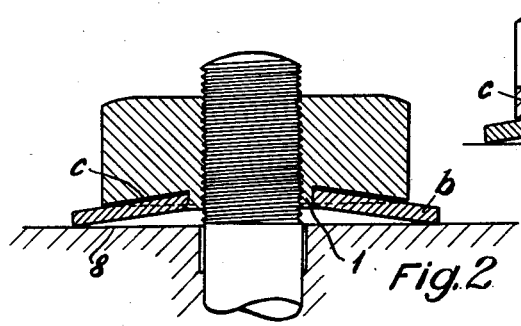
Figure 5:
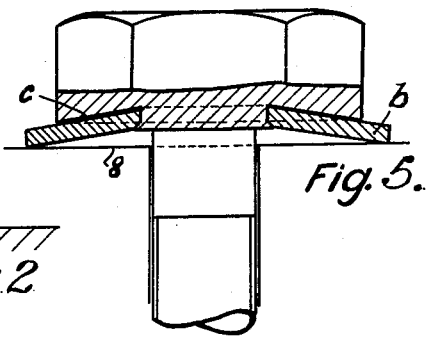
Figure 3:
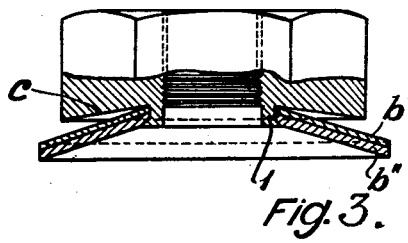
Figure 6:
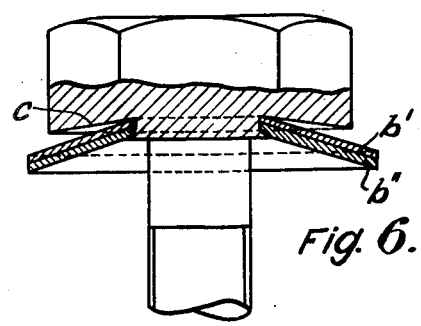

Some embodiments of the invention are shown by way of example in the accompanying drawing in which Figure 1 is a side view partly in section of the invention applied to a nut, Figure 2 is a side view partly in section of the form of Figure 1 in use, Figure 3 is a side view partly in section of a modification applied to a nut, Figure 4 is a side view partly in section of a form similar to Figure 1 applied to a bolt, Figure 5 shows the bolt of Figure 4 in use and Figure 6 shows yet a further modification, similar to Figure 3 applied to a bolt.

In all the forms of the invention, the working or abutting face of the nut or bolt head, has a central bead 1 formed on it of larger diameter than outside diameter of the threads. In the case of the nut this bead is tubular and the thickness of the wall may be reduced by removing the threads. This provides inter alia a useful guide in placing the nut on its bolt or stud. A circumferentially unbroken washer $b$ of resilient material of uniform thickness and of truncated conical form has a central hole fitting with slight clearance over the bead, this hole being countersunk on its lower side. The washer is slipped over the bead and the edge of the bead riveted or beaded over and fills the countersink so that the washer is held permanently in position, but is freely rotatable with respect to the nut or bolt head.

Instead of a single washer, a plurality, for example two washers $b'$ $b''$, may be used as shown in Figures 3 and 6 in which case only the lowermost washer needs to be countersunk.

The working or abutting face of the nut or bolt is hollowed out conically at $c$ as in Figures 1–6. Naturally the depth of the washer in the free position is greater than the depth of hollowing of the nut or bolt face. In other words the apical angle of the washer is less than that of the working or abutting face. The contact of the washer with the coned face $c$ forms a stop, limiting the possible deformation of the washer by the act of tightening the nut or bolt. It will be observed that the act of tightening tends to flatten the washer but that the stop comes into action before the washer is flat. The diameter thickness, material and degree of conicity of the washer is in all cases designed so that in the extreme position the washer is not stressed beyond the elastic limit, and it therefore exerts a continuous high pressure when it is in action which effectively locks the nut or washer to which it is fitted. The nut or bolt can be of any convenient known form exemplified in the drawing by the hexagon type, and is tightened and loosened in the usual way without any unusual tool; moreover the washer is permanently attached and therefore cannot be lost.

What I claim is:—

A screw locking device comprising a screwed member, a hollow truncated conical working face thereon, and a truncated conical circumferentially unbroken resilient washer of uniform thickness of smaller apical angle than said working face, the difference in apical angle between said working face and said washer being such that during tightening of said screwed member said washer is deflected into surface contact with said working face but is still within its elastic limit when said screwed member is fully tightened.

NICOLAS VACHER.